INVENTORS
JAMES G. BUCK,
ROBERT A. WINKLESS
& HOWARD L. GERBER

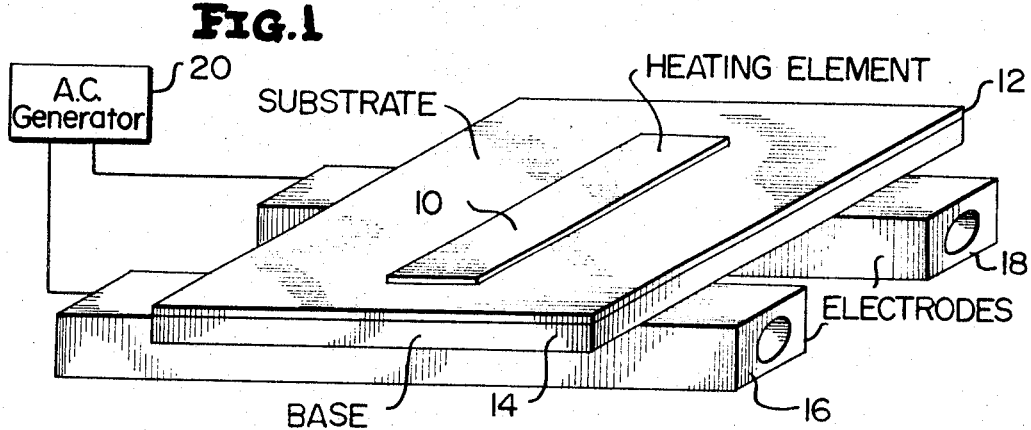
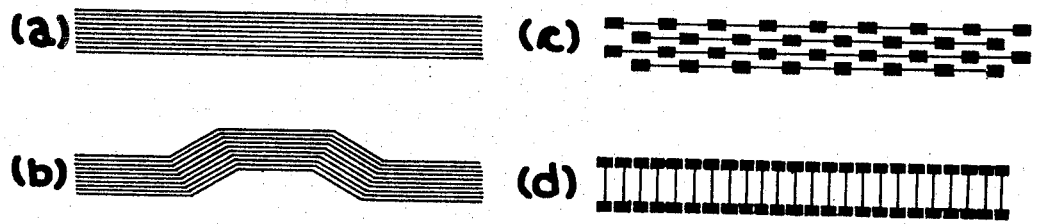
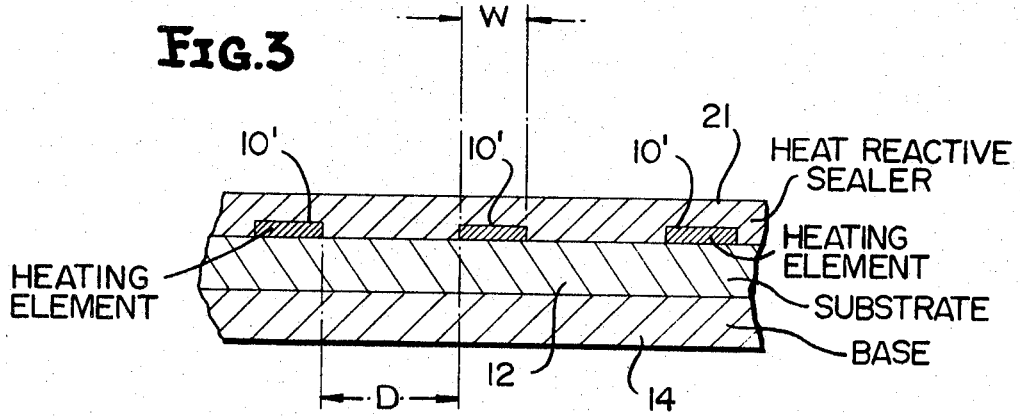

BY
Mason, Porter, Willer & Brown
ATTORNEYS

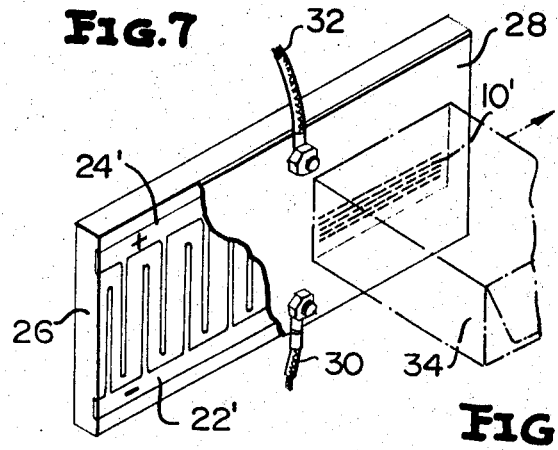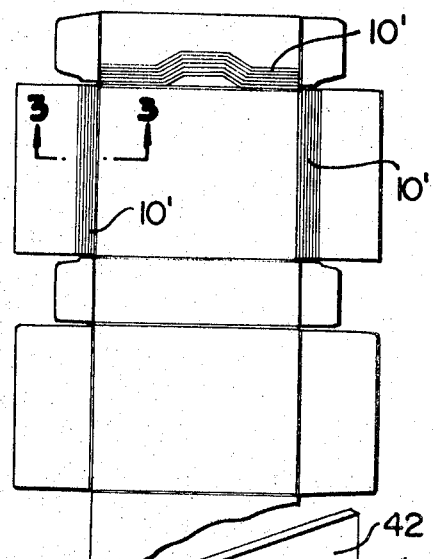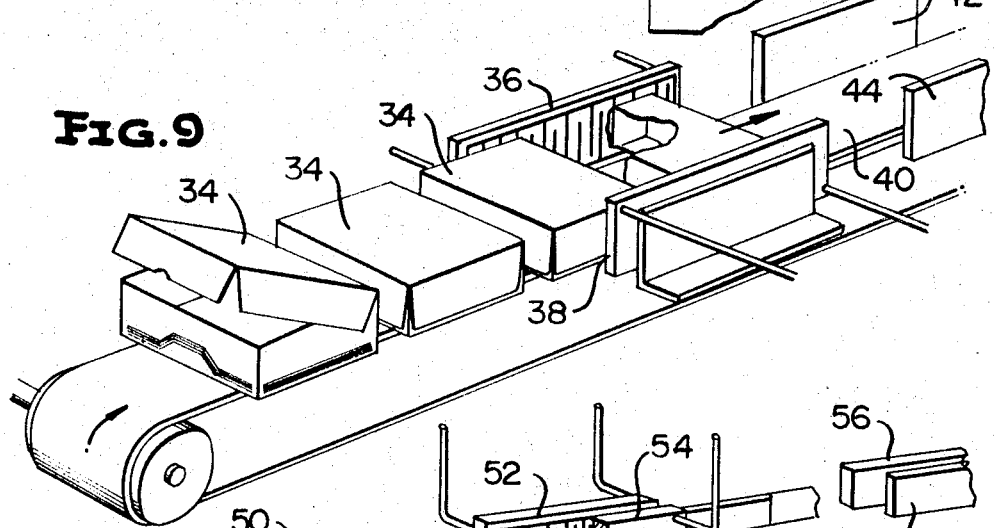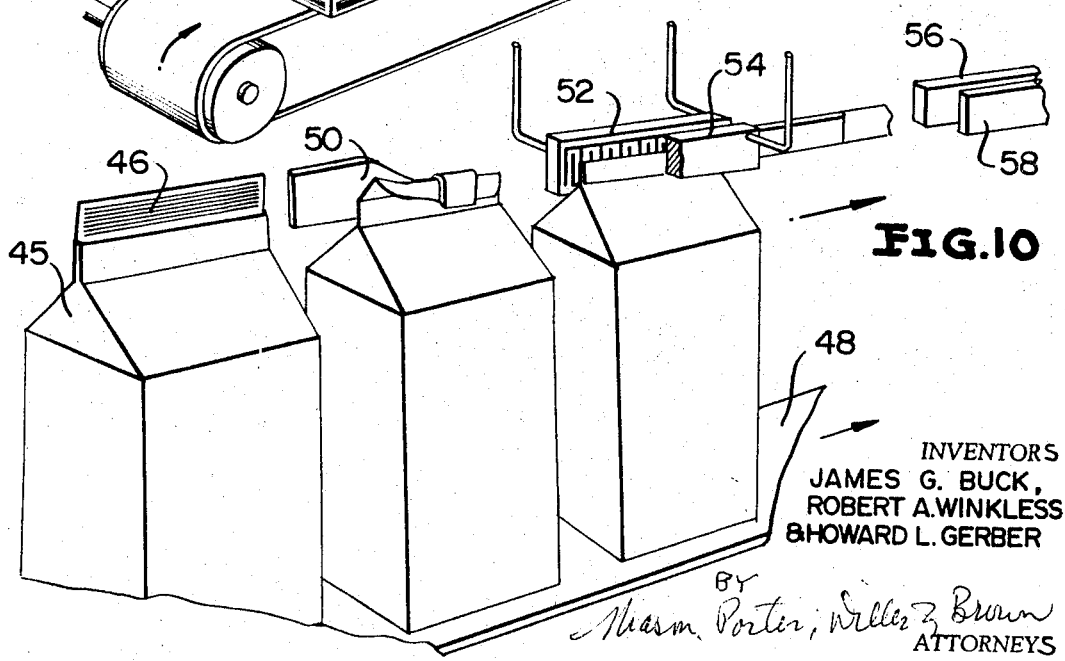

United States Patent Office 3,450,856
Patented June 17, 1969

3,450,856
ELECTRICAL HEAT TREATING SYSTEM FOR SEALING CARTONS OR THE LIKE
James G. Buck, Western Springs, Robert A. Winkless, Oak Lawn, and Howard L. Gerber, Park Forest, Ill., assignors to Continental Can Company, Inc., New York, N.Y., a corporation of New York
Filed Dec. 28, 1966, Ser. No. 605,380
Int. Cl. B23k 13/02
U.S. Cl. 219—10.53                       12 Claims

ABSTRACT OF THE DISCLOSURE

Methods and apparatus for heat sealing cartons by positioning upon carton portions to be sealed an electrical conductor and establishing an alternating electric field in the area of the electrical conductor to effect heating of the conductor and proximate heat-reactive material by electrical conduction in the conductor induced therein by capacitive coupling with nearby field producing electrodes.

---

This invention relates to an electrical heating system for generating heat in an electrical conductor by means of the tangential portion of a radio frequency alternating current electric field. Although the invention is useful in many diverse applications, it is particularly useful in the sealing of cartons and will be described in connection therewith.

In sealing cartons, it is often desirable to coat the inside of the carton flap with a heat reactive sealing material such as wax or the like and to seal the carton by heating the wax and holding the carton flap closed until the heated wax has cooled. In the past this has been done by applying heat to the outside of the carton flap, with the heat being transmitted to the heat reactive sealing material through the carton flap. The direct application of heat, however, has several disadvantages. In the first place, since the heat must be transmitted through the carton flap, and since paper board carton flaps are poor conductors of heat, a relatively high level of heat must be applied to the outside of the carton flap in order to melt the sealing material on the interior thereof. With wax or polyethylene coated cartons, such as used in packaging frozen foods, the application of a high level of heat to the exterior of the carton melts the exterior coating and necessitates the use of a paper overwrap. Also, the time required to heat and to cool the entire carton flap by the direct application of heat limits the speed of sealing to the relatively low level of 60 to 80 cartons per minute.

In accordance with this invention, however, a novel electrical heating system has been devised which is capable of sealing cartons at the rate of 250 per minute without any direct application of heat to the exterior of the carton, thereby eliminating the necessity of a paper overwrap on wax or polyethylene coated cartons. In general terms, the electrical heating system of this invention involves joulean heating of an electrical conductor by means of the tangential portion of a high frequency alternating current electric field. To clearly distinguish this invention from the prior art, however, it will be necessary to review the various types of electrical heating systems before describing the invention in detail.

In simple electrical heating systems, heat is produced in a resistance element by passing a direct or alternating current through the resistance element. The passage of an electrical current through the resistance element generates an amount of heat which is proportional to $I^2R$, where I is the value of current flow in amperes and R is the value of resistance in ohms. This type of heating is referred to as joulean heating, and it can be produced by a direct connection between the electrical power source and the resistance element or by induction coupling therebetween.

In the case of induction coupling, energy is coupled from a radio frequency AC power source to a load by means of a radiated electro-magnetic field which can produce heat by magnetic field heating or by electric field heating. In magnetic field heating, the heat can be produced by eddy current heating or by hysteresis heating. Eddy currents are circulatory currents that are induced in any electrical conductor, even a flat plate, by alternating magnetic fields, and these eddy currents produce heat by joulean heating, the level of heat being proportional to $I^2R$. If the load element is a ferro-magnetic material, either wholly or in part, heat will also be induced by hysteresis losses, the level of heat being proportional to the energy required to rotate the magnetic dipoles of the ferro-magnetic material in response to the alternating magnetic field. This invention, however, is concerned only with electric field heating, and the foregoing description of magnetic field heating is set forth only for the purpose of distinguishing this invention from the prior art.

In electric field heating, heat can be produced by current flow induced in the load by the alternating electric field (joulean heating) or by dielectric heating, which is analogous to hysteresis heating. The characteristics of dielectric heating will not, however, be discussed in detail here, since this invention does not involve dielectric heating.

The joulean heating produced by an alternating electric field can be induced by the perpendicular component of the field or by the tangential component of the field or by both. A radiated electric field has a direction, and it can thus impinge either perpendicularly or tangentially on a conductor placed in the field, or it can impinge on the conductor at an acute angle which can be broken up into perpendicular and tangential components. This invention is specifically concerned with tangential field heating, i.e., with joulean heating that is produced by the tangential component of an alternating electric field. Although this invention does involve some perpendicular field heating, as will be explained later, the perpendicular field heating is small in comparison with the tangential field heating. Accordingly, this invention is principally characterized by tangential field heating.

With the foregoing background in mind, the invention can now be described in general terms. As applied to cartons which utilize heat reactive sealers, the invention comprises a plurality of electrically conductive heating elements attached to the inside of the carton flap adjacent to the heat reactive sealer, an electrode structure positioned to apply the tangential component of an alternating electric field to the heating elements to induce current flow therein, and a source of radio frequency energy coupled to the electrode structure to generate the alternating electric field. In the preferred carton sealing structure, the electrodes are mounted in a stationary position adjacent to a conveyor, and the cartons to be sealed are moved past the stationary electrodes to be heated and sealed thereby. The heating elements are disposed in a predetermined geometric pattern on the interior of the carton flap in the area which is to be heated. In this application, the heating system of this invention provides a carton sealing system which increases the speed of sealing from 80 cartons per minute to 250 cartons per minute and which also eliminates the need for a paper overwrap to hide heat damage to the exterior of the carton. It should be understood, however, that the application of the invention to carton sealing equipment is just one example of many uses for the invention, and that the invention is by no means restricted to carton sealing equipment.

Accordingly, one object of this invention is to provide an improved electrical heating system in which the tangential portion of a radio frequency alternating current electrical field is employed to induce heat in an electrically conductive heating element by means of joulean heating.

Another object of this invention is to provide an improved electrical heating system in which selectively defined areas of a plane surface can be heated to a predetermined temperature by means of the tangential portion of a radio frequency alternating current electric field.

A further object of this invention is to provide an improved carton sealer which is faster and more efficient than those heretofore known in the art.

An additional object of this invention is to provide a carton sealer which is capable of heat sealing the interior of a carton flap without any damage to a heat sensitive coating on the exterior thereof.

Another object of this invention is to provide a geometric pattern of electrically conductive heating elements for most effectively applying heat to a predetermined area of an adjacent layer of heat reactive material.

Other objects and advantages of the invention will be apparent to those skilled in the art from the following description of one illustrative embodiment thereof, as illustrated in the attached drawings, in which:

FIGURE 1 is a diagrammatic representation of the basic heating system of this invention;

FIGURE 2 shows various geometric patterns in which the heating elements of this invention can be arranged to produce a predetermined pattern of heat;

FIGURE 3 is an enlarged section of a carton flap adapted to be heat-sealed by the heating system of this invention;

FIGURE 7 shows the electrode structure of FIGURE 5 mounted for use in carton sealing apparatus;

FIGURE 8 shows a frozen food carton blank adapted to be heat-sealed by the heat sealing system of this invention;

FIGURE 9 shows one illustrative heat sealing system of this invention for the carton blank of FIGURE 8; and FIGURE 10 shows another heat sealing system of this invention adapted to heat-seal milk cartons.

Figure 4:
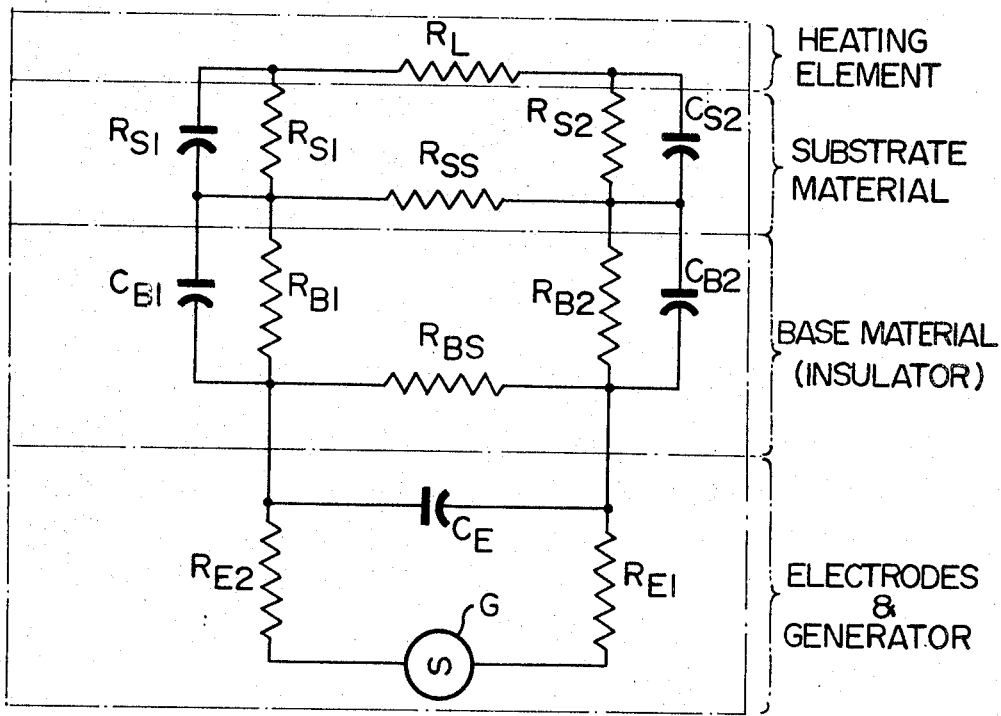
FIGURE 4 is a schematic diagram of the electrical circuit defined by the structure of FIGURE 1.

FIGURE 1 is a diagrammatic representation of one specific heating element 10 and excitation system of this invention. Heating element 10 comprises a strip of conductive material of any suitable type and cross-sectional area. The material and cross-sectional area of heating element 10 can be controlled by well known prior art techniques to give any desired level of resistance, thereby producing any desired level of heat in the strip in response to a voltage coupled between the ends of the strip. In the example shown in FIGURE 1, heating element 10 is affixed to a substrate layer 12 which, in turn, has been affixed to a non-conducting base material 14. It is essential that the base material 14 be a non-conductor, for reasons which will be explained later. It should be noted here that the function of substrate layer 12 is merely to provide a suitable surface on which to affix heating element 10, and the material used for the substrate will, of course, be dependent upon the materials used for the heating element and the base. In some embodiments of the invention, however, it may be possible to affix the heating element directly to the base material without the use of the substrate layer, and therefore the substrate layer is not an essential feature of the invention.

The heating element of FIGURE 1 is activated by placing the base material adjacent to a pair of electrodes 16 and 18 which are positioned to apply the tangential portion of an electric field generated thereinbetween to heating element 10. Electrodes 16 and 18 are coupled to the output circuit of a high frequency alternating current generator 20 which produces a high frequency alternating current potential between the two electrodes. The tangential portion of the electric field developed between electrodes 16 and 18 produces an alternating current flow in heating element 10 and the flow of current in heating element 10 produces a level of heat proportional to the square of the current flow multiplied by the value of the resistance. The value of resistance for any given heating element is determined by its length, cross-sectional area, and the material from which it is made, as well known to those skilled in the art.

FIGURE 4 is a schematic diagram of the electrical circuit disclosed in FIGURE 1. In this schematic circuit diagram, the various resistances and capacitances shown are correlated with their physical location by means of legends on the right hand of the schematic. Starting with the generator and the electrodes, in the lower part of the schematic, the circuit contains the output impedance of each of the two electrodes shunted by their interelectrode capacitance. The output impedance of the two electrodes, which are designated $R_{E1}$ and $R_{E2}$, includes the impedance of the generator itself. The inter-electrode capacitance is designated as $C_E$. When the electrodes are in direct contact with the base material, there will be a shunt resistance $R_{BS}$ across the two electrodes. It will now be apparent to those skilled in the art why it is necessary that the base material be an insulator. If the base were made of a conducting material, it would constitute a direct short across the two electrodes.

The electrical circuit further comprises the direct resistance between the base material, the substrate material, and the ends of the heating element, as designated by the impedances $R_{B1}$, $R_{B2}$, $R_{S1}$ and $R_{S2}$. These resistances are in turn each shunted by corresponding capacitances $C_{B1}$, $C_{B2}$, $C_{S1}$ and $C_{S2}$. The circuit is then completed by the shunt resistance of the substrate material $R_{SS}$ and the impedance of the heating element $R_L$. From the above circuit, the magnitude of heating current that will flow through the heating element $R_L$ can be easily computed by those skilled in the art for any given application of the invention using well known prior art formulas.

FIGURE 2 shows several patterns of heating elements which can be used to produce a predetermined pattern of heat over a given geometric area. The patterns shown in FIGURES 2a and 2b comprise relatively uniform parallel lines, and the patterns shown in FIGURES 2c and 2d include enlarged areas which produce cool spots in the heating pattern. The patterns shown in FIGURES 2a and 2b are used in an exemplary carton sealing system, as described below, and the patterns shown in FIGURES 2c and 2d are variations which can be used in other applications of the invention. It will be apparent to those skilled in the art, of course, that many other geometric patterns can be formed from the basic heating elements of this invention.

FIGURES 3 and 5 through 9 illustrate the application of the heating system of this invention to the sealing of frozen food cartons. FIGURE 8 shows a frozen food carton blank three sides of which are imprinted with heating elements 10' which are arranged in patterns such as disclosed in FIGURES 2a and 2b. FIGURE 3 is an enlarged cross-sectional detail taken on the line 3—3 of FIGURE 8 showing the dimensions and relative spacing of the individual heating elements 10'. In this particular application of the invention, the heating elements 10' comprise electro-conductive ink which is imprinted on the carton blank by the dry offset printing method. The conductive material in the conductive ink can be carbon, aluminum, silver, platinum, gold, nickel, tin, or copper. Silver is most frequently used for low resistance ink, and carbon for high resistance ink. In this particular example, carbon is used as the conductive material in the ink. As best shown in FIGURE 3, the pattern of heating elements is covered with a heat sealable wax 21 such as EVA (ethylene vinyl acetate-paraffin blend). This type of wax provides an attractive high gloss frozen food carton in comparison with poly-coated waxes. EVA is also strong enough to produce a fiber tear seal, i.e., a seal in which the wax-to-wax seal is stronger than the carton paperboard material. It will be understood, of course, by those skilled in the art that other heat sealable materials such as polyethylene can also be used in connection with this invention.

The dimensions of the conductive lines and the spacing between the conductive lines is selected to give the required level of heat to melt the sealing material. In this particular application of the invention, a power absorption level of approximately 70 watts is required, and this is achieved by means of conductive lines having a width W of 0.005 inch with a spacing D of approximately 0.01 inch. Although the foregoing dimensions apply only to one particular application of the invention, and will be varied in other applications of the invention, it has been found in general that a ratio of approximately 2 to 1 between the spacing D between the lines and the width W of the lines produces the most favorable results.

Figure 5:
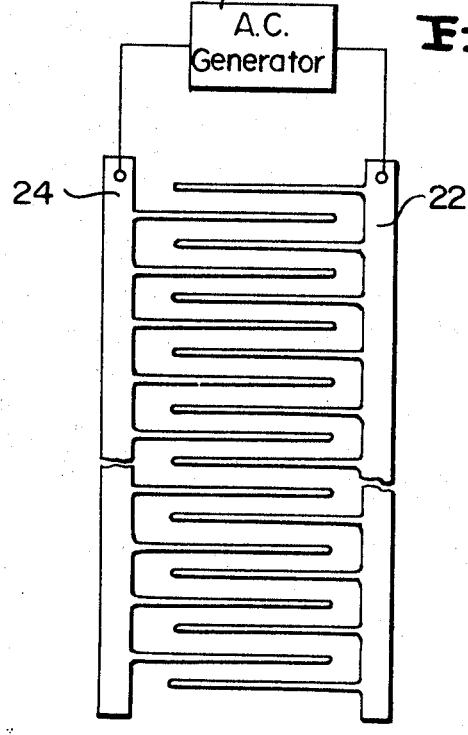
FIGURE 5 shows one illustrative electrode structure which can be used in connection with this invention.
Figure 6:
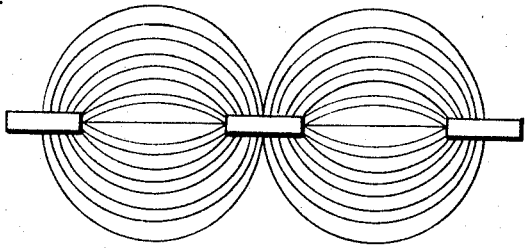
FIGURE 6 shows the electric field produced between adjacent electrodes of the electrode structure of FIGURE 5.

FIGURE 5 shows a particular electrode structure to be used in connection with the above described cartons. The electrode structure comprises two comb-like electrodes 22 and 24 whose individual teeth are intermeshed and which are coupled to a source of radio frequency energy 26. As shown in FIGURE 6, the electric field between each adjacent pair of electrodes has a tangential portion which is parallel to the plane of the electrodes. The conductive pattern on the carton blank shown in FIGURE 8 is passed across the electrode structure in such position that the lines on the pattern move down the electrode structure linearly and the electric field between each adjacent pair of rungs energizes the corresponding portion of the heating element as it passes by, thereby heating the conductive line along its entire length as it passes by the electrode. As shown in FIGURE 7, the electrode structure in this particular embodiment of the invention comprises a pair of etched copper electrodes 22' and 24' which are embedded in a block of high impact styrene 26. The surface of the electrode structure is coated with a styrene cover sheet 28, and conductors 30 and 32 are coupled respectively, to the electrodes 22' and 24' to be energized by the source of radio frequency energy. A carton 34 is indicated diagrammatically in FIGURE 7 to show the direction of movement of the conductive lines with respect to the electrode structure.

FIGURE 9 indicates diagrammatically an illustrative carton sealing system of this invention including two electrodes 36 and 38 which are placed in side-by-side arrangement to heat-seal two sides of the cartons after they have been filled and closed. The cartons are carried past electrodes 36 and 38 by a conveyor belt 40 which is driven by means not shown but which will be apparent to those skilled in the art. After passing between electrodes 36 and 38, the two sides of the cartons pass chill rails 42 and 44 to cool the heat-sealable wax and complete the seal on the carton. The length of electrodes 36 and 38 and chill rails 42 and 44 are chosen in accordance with the speed of the conveyor to give the desired length of heating and cooling time. In this particular embodiment of the invention, which is operated at a rate of 250 cartons per minute, the electrodes 36 and 38 are approximately 8 inches long and the chill rails 42 and 44 are approximately 6 feet long. The exact lengths will, however, vary in accordance with each particular application of the invention. In the embodiment of the invention in FIGURE 9, only the two opposing sides of the cartons 34 are sealed at one time. The front flap of the carton is sealed in a similar fashion by turning the carton around and moving it past a heating electrode and chill rails similar to those shown in FIGURE 9. The details of this second operation are not shown in FIGURE 9, but they will be apparent to those skilled in the art.

FIGURE 10 shows another embodiment of this invention for sealing milk cartons 45 which have a conductive pattern 46 printed thereon. In this embodiment of the invention, the cartons 45 are moved by means of a conveyor 48 past a flap closing cam 50 and thence between a pair of electrodes 52 and 54, which are similar in structure to the electrodes 36 and 38, and thence past a pair of chill rails 56 and 58.

While one form of the invention has been shown for purposes of illustration, it is to be understood that various changes in the details of construction and arrangement of parts may be made without departing from the spirit and scope of the invention as defined in the appended claims.

We claim:

1. An electrical heating system for heating a heat-reactive material, said heating system comprising at least one heating element positioned adjacent to said heat-reactive material, said at least one heating element comprising a piece of electrically conductive material, an electrode structure separated from said heating element positioned to apply the tangential component of an alternating electric field to said heating element to induce current flow therein, and a source of energy coupled to the electrode structure sufficient to generate the alternating electric field.

2. The combination defined in claim 1 having a plurality of heating elements including said at least one heating element, each comprising a relatively long, narrow strip of electrically conductive material having a predetermined value of electrical resistance, said heating elements being arranged in a pattern of spaced parallel strips adjacent to said heat-reactive material.

3. In a container member having a heat reactive sealing material affixed to a surface thereof, the improvement comprising a plurality of heating elements attached to said container and positioned to transmit heat to said heat reactive sealing material, each of said heating elements comprsing a piece of electrically conductive material adapted to receive an alternating current voltage between two points thereof to produce an alternating current flow between said two points, thereby generating a level of heat proportional to the square of said current flow multiplied by the resistance of said conducting material, and said plurality of heating elements being arranged in a predetermined geometrical pattern to transmit a predetermined pattern of heat to said heat reactive sealing material when the heating elements thereof are activated by an alternating current voltage.

4. The combination defined in claim 3 wherein said device contains a piece of insulating material, and wherein each of said heating elements are attached to said insulating material and adapted to receive said alternating current voltage by capacitive coupling through said insulating material.

5. The combination defined in claim 4 wherein each of said heating elements comprises a relatively long, narrow strip of conductive material having a predetermined value of electrical resistance.

6. The combination defined in claim 5 wherein said heating elements are arranged in a geometrical pattern of spaced parallel strips.

7. A method of heating one side of a non-conducting material comprising the steps of (A) affixing at least one electrically conductive heating element to said one side of said non-conducting material, (B) generating a high frequency alternating current voltage, and (C) applying said high frequency alternating current voltage to the other side of said non-conducting material to induce a flow of alternating current in said at least one electrically conductive heating element by capacitive coupling, thereby producing a predetermined pattern of heat on said one side of said non-conducting material.

8. A method of sealing a non-conducting carton flap comprising the steps of (A) affixing a plurality of electrically conductive heating elements to the inner surface of said carton flap in a predetermined pattern, (B) affixing a heat-reactive sealing material to one surface of said carton adjacent to said heating elements, (C) closing said carton flap to bring said heat-reactive sealing material into contact with an opposing surface of said carton, (D) generating a high frequency alternating current voltage, (E) applying said high frequency alternating current voltage to the outer surface of said carton flap to induce a flow of current in said electrically conductive heating elements by capacitive coupling, thereby producing a predetermined pattern of heat on the inside surface of said carton flap to melt said heat reactive sealing material, and (F) holding said carton closed while said sealing material cools to seal said carton flap to said opposing surface of said carton.

9. The combination defined in claim 1 wherein the energy source is of high frequency.

10. The combination defined in claim 9 wherein the energy source is in the radio frequency range.

11. A method of joining together non-conducting carton portions including the steps of conveying, along a predetermined path, cartons having non-conducting portions with heat-reactive sealing material and conductive elements thereon, and heating the conductive elements and proximate sealing material on the non-conducting carton portions during said step of conveying, by establishing a high frequency current flow in the conductive elements to provide joulean heating of the elements and transfer of heat to proximate sealing material, said step of heating by establishing a high frequency current flow comprising establishing a high frequency electric field through the non-conducting carton portions with a tangential field component parallel to the conductive elements, said step of establishing including mounting electrodes in electrically insulated relation proximate the portion of the predetermined path in which the conductive elements move for the production of the high frequency field between the electrodes and applying a high frequency alternating voltage across the electrodes.

12. Apparatus for joining together non-conducting carton portions including means for conveying, along a predetermined path, cartons having non-conducting portions with heat-reactive sealing material and conductive elements thereon, and means for heating the conductive elements and proximate sealing material on the non-conducting carton portions during the conveying thereof by establishing a high frequency current flow in the conductive elements to provide joulean heating of the elements and transfer of heat to proximate sealing material, said means for heating by establishing a high frequency current flow comprising means for establishing a high frequency electric field through the non-conducting carton portions with a tangential field component parallel to the conductive elements, said means for establishing including means mounting electrodes in electrically insulated relation proximate the portion of the predetermined path in which the conductive elements move for the production of the high frequency field between the electrodes and means for applying a high frequency alternating voltage across the electrodes.

References Cited

UNITED STATES PATENTS

| | | | |
|---|---|---|---|
| 2,535,413 | 12/1950 | Hart et al. | 219—10.53 X |
| 2,631,642 | 3/1953 | Richardson et al. | 219—10.53 X |
| 3,027,443 | 3/1962 | Reed et al. | 219—10.53 X |

RICHARD M. WOOD, Primary Examiner.

L. H. BENDER, Assistant Examiner.

U.S. Cl. X.R.

219—6.5, 10.41, 10.81